United States Patent
Liu et al.

(10) Patent No.: US 8,367,237 B2
(45) Date of Patent: Feb. 5, 2013

(54) ELECTRONIC DEVICE WITH BATTERY EJECTION MECHANISM

(75) Inventors: De-Hua Liu, Shenzhen (CN); Jian-Hui Dai, Shenzhen (CN); Meng-Hua He, Shenzhen (CN); Yu-Tao Chen, Taipei Hsien (TW); Te-Sheng Jan, Taipei Hsien (TW)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 358 days.

(21) Appl. No.: 12/775,432

(22) Filed: May 6, 2010

(65) Prior Publication Data

US 2011/0076537 A1    Mar. 31, 2011

(30) Foreign Application Priority Data

Sep. 25, 2009   (CN) .......................... 2009 1 0307681

(51) Int. Cl.
*H01M 2/10* (2006.01)
*H02B 1/00* (2006.01)
*H05K 5/00* (2006.01)
*H05K 7/00* (2006.01)
*H04B 1/034* (2006.01)

(52) U.S. Cl. ............ 429/97; 429/96; 429/100; 361/600; 361/679.01; 455/128; 455/347

(58) Field of Classification Search .................. 429/97, 429/100; 361/600, 679.01; 455/128, 347
See application file for complete search history.

(56) References Cited

U.S. PATENT DOCUMENTS 5,649,750 A * 7/1997 Ishii et al. .................. 312/223.2

\* cited by examiner

*Primary Examiner* — Basia Ridley
*Assistant Examiner* — Sean P Cullen
(74) *Attorney, Agent, or Firm* — Altis Law Group, Inc.

(57) ABSTRACT

An electronic device comprises a housing, a battery retainer arranged in the housing, a battery, a movable member and at least one resilient member. The battery retainer defines a battery cavity and a spring tab. The battery retained in the battery cavity defines a recessed portion and a protrusion protruding from the bottom of the recessed portion. The recessed portion defines a plurality of sloped surfaces and vertical walls surrounding the protrusion. The protrusion defines a side wall. The movable member comprises a first end rotatably connected to the battery retainer and a second end connecting the sloped surfaces. After the battery is pushed into the battery cavity, one of the sloped surfaces engages the second end of the movable member to move until the second end disengages from the side wall of the protrusion.

8 Claims, 9 Drawing Sheets

ELECTRONIC DEVICE WITH BATTERY EJECTION MECHANISM

BACKGROUND

1. Technical Field

The present disclosure relates to electronic devices including a removable battery and, more particularly, to an electronic device including an ejection mechanism to eject a battery.

2. Description of Related Art

Generally, electronic devices, such as mobile phones, include a housing defining a battery cavity to receive a battery. When removing the battery from the housing, a back cover has to be detached from the housing. After repeated use from normal removal and replacement of the battery, the connection between the back cover and the housing tends to become loose.

Therefore, what is needed is an electronic device including a battery ejection mechanism to overcome the shortcoming described above.

BRIEF DESCRIPTION OF THE DRAWINGS

The components of the drawings are not necessarily drawn to scale, the emphasis instead being placed upon clearly illustrating the principles of an electronic device with battery ejection mechanism. Moreover, in the drawings, like reference numerals designate corresponding parts throughout several views.

DETAILED DESCRIPTION

Figure 1:
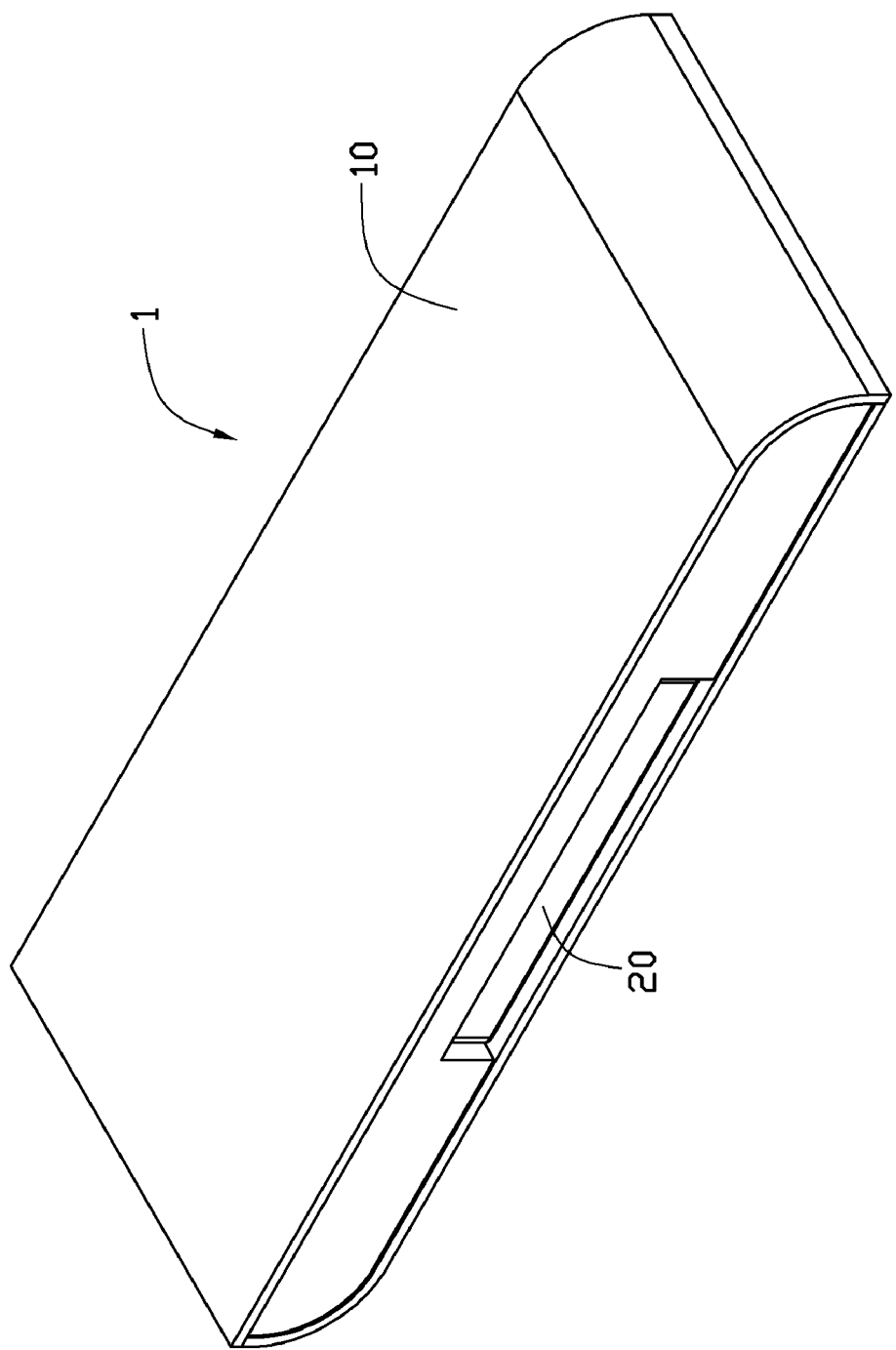
FIG. 1 is an isometric view of an electronic device with a battery ejection mechanism in accordance with an exemplary embodiment.

Referring to FIG. 1, an electronic device 1 in accordance with an exemplary embodiment is illustrated. The electronic device 1 includes a housing 10 and a battery 20 retained within the housing 10.

Figure 2:
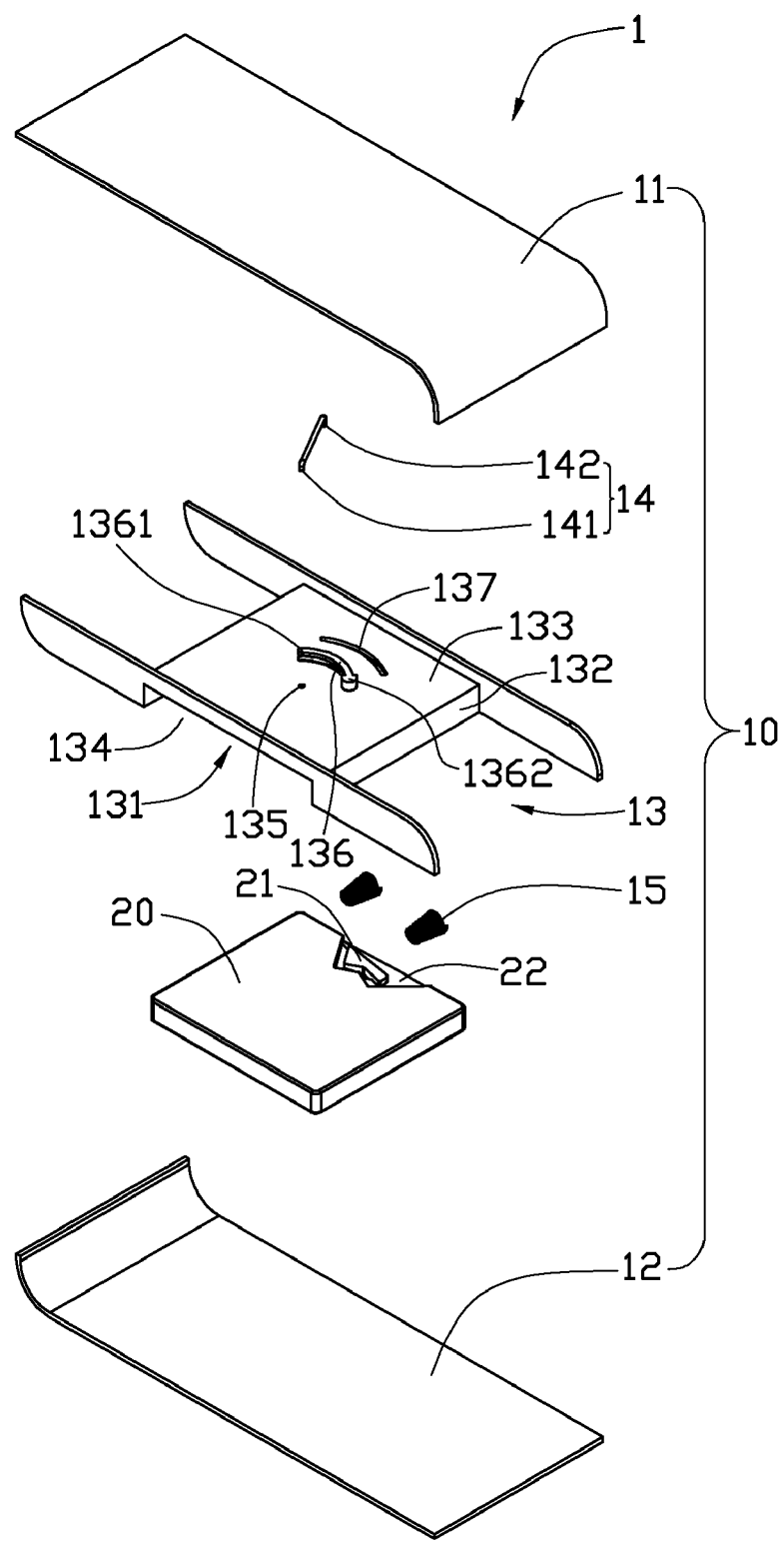
FIG. 2 is an exploded view of the electronic device of FIG. 1.

Referring to FIG. 2, the housing 10 includes a cover 11, a base 12 and a battery retainer 13. The cover 11 and the base 12 are fixed together. The battery retainer 13 is arranged between the cover 11 and the base 12. The battery 20 is received and retained in the battery retainer 13.

The battery retainer 13 defines a battery cavity 131, four side walls 132 and a top wall 133 surrounding the battery cavity 131. The battery retainer 13 defines an opening 134 through one of the four side walls 132, a center hole 135 and a slot 137 through the top wall 133. The battery 20 can be pushed into the battery cavity 131 through the opening 134. The slot 137 is arc shaped and concentric with the center hole 135. The battery retainer 13 further defines a spring tab 136 on the top wall 133. The spring tab 136 includes a fixing end 1361 fixed to the top wall 133 and a free end 1362, which constitutes a cantilevered structure. The spring tab 136 can thus be deflected elastically after an external press is applied thereon.

Figure 3:
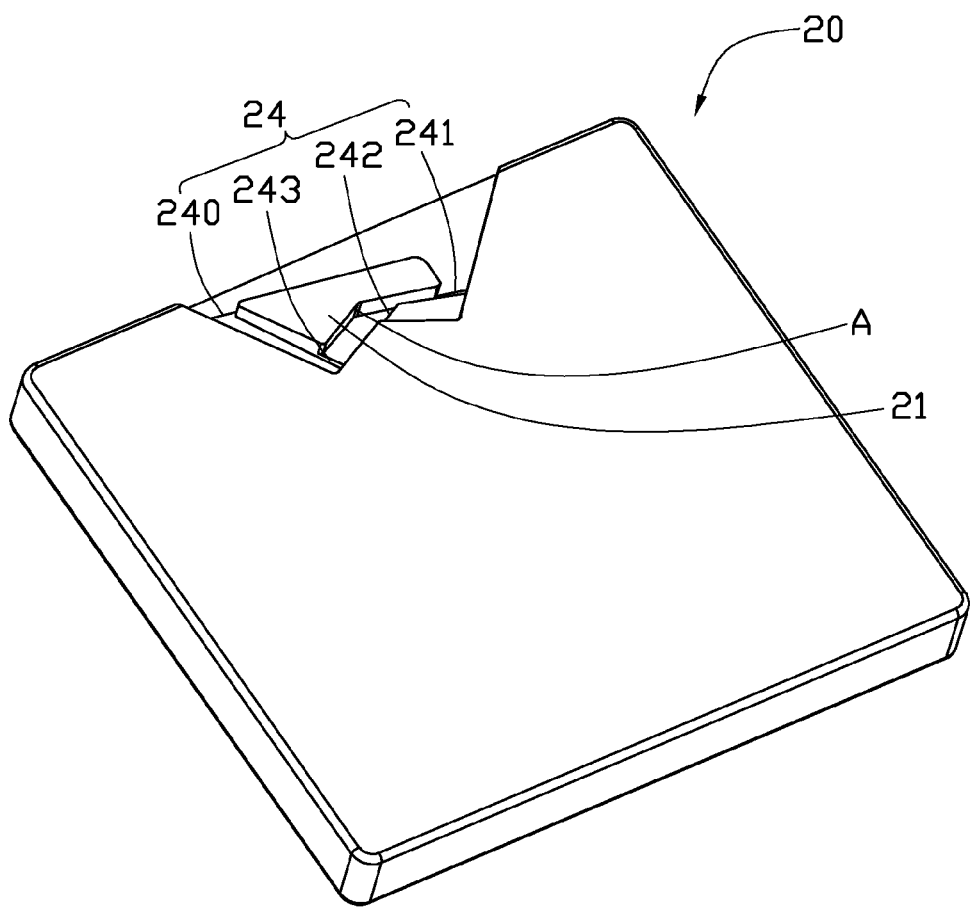
FIGS. 3 and 9 are isometric views of the battery of the electronic device of FIG. 1.
Figure 4:
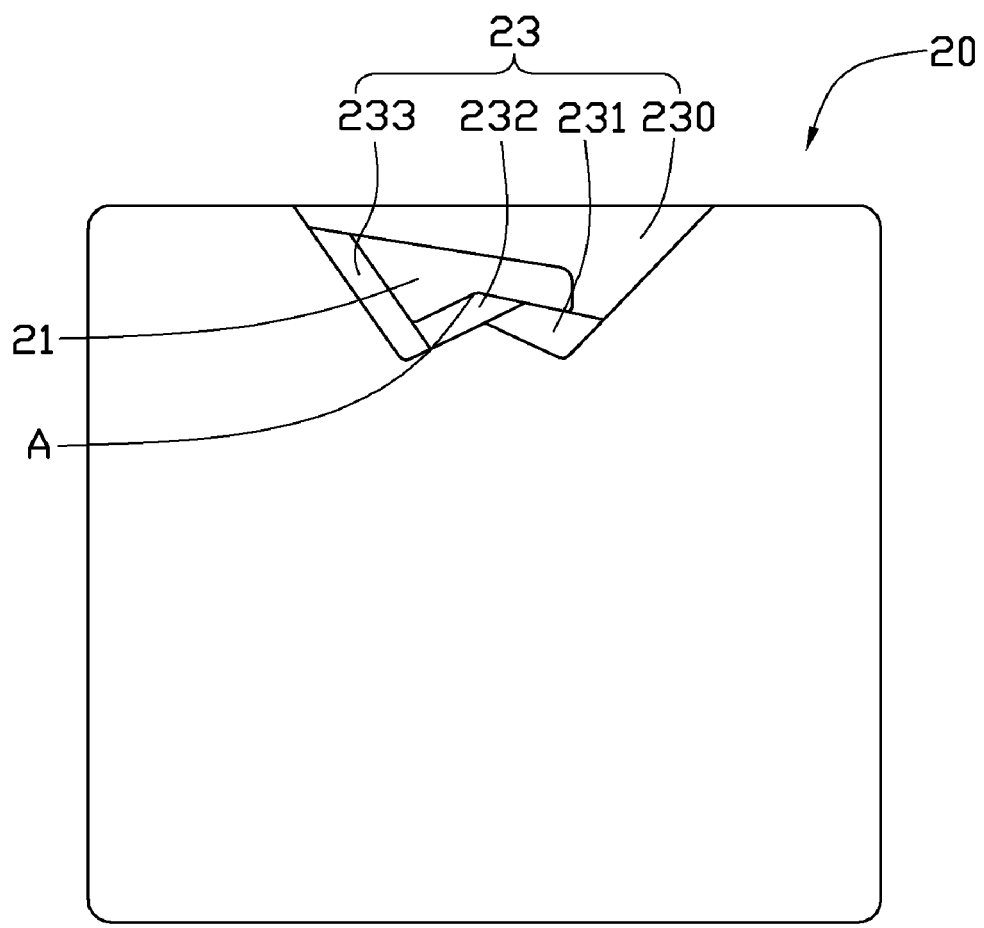
FIG. 4 is a front view of the battery of the electronic device of FIG. 1.
Figure 9:
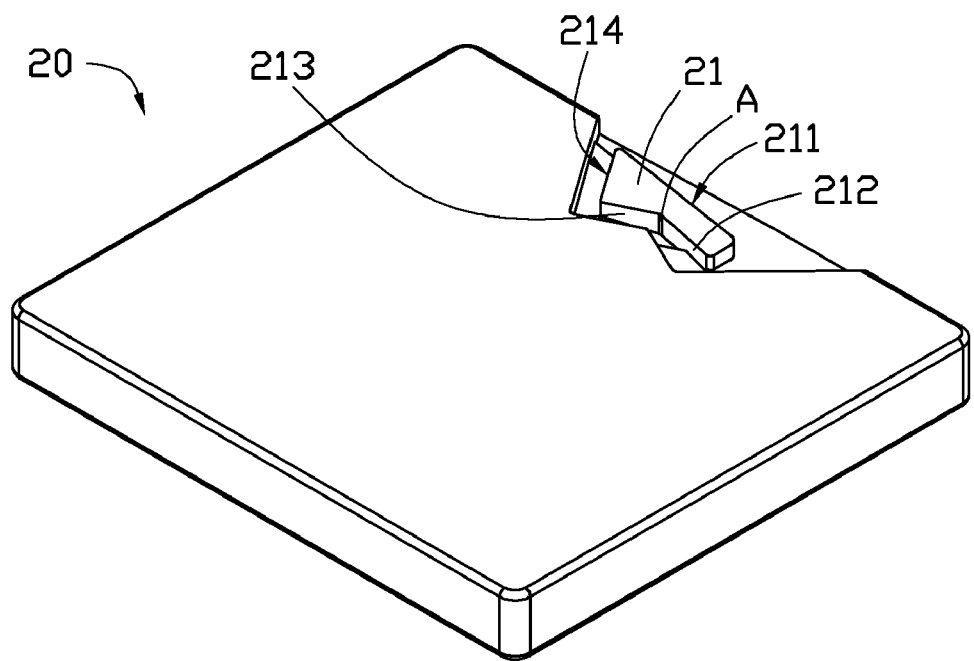

The battery 20 on one side defines a recessed portion 22 and a protrusion 21 protruding from a bottom of the recessed portion 22. The battery 20 is slidably received in the battery cavity 131 of the battery retainer 13. Referring to FIGS. 3 and 4, the protrusion 21 includes a first side wall 211, a second side wall 212 connected to the first side wall, a third side wall 213 connected to the second side wall 212, and a fourth side wall 214 connecting between the first side wall 211 and the third side wall 213. The first side wall 211, the second side wall 212, the third side wall 213, and the fourth side wall 214 are oriented obliquely to a sliding direction of the battery 20 (see FIG. 9). The second side wall 212 and the third side wall 213 cooperatively define a side wall A therebetween. The recessed portion 22 includes a plurality of sloped surfaces 23 and vertical walls 24 circling the protrusion 21. In the exemplary embodiment, the vertical walls 24 include a first vertical wall 240, a second vertical wall 241, a third vertical wall 242 and a fourth vertical wall 243. The sloped surfaces 23 include a first sloped surface 230, a second sloped surface 231, a third sloped surface 232, and a fourth sloped surface 233. The first sloped surface 230 slopes upward from the bottom of the first vertical wall 240 toward the top of a second vertical wall 241. Similarly, the second sloped surfaces 231 slopes upward from the bottom of the second vertical wall 241 toward the top of the third vertical wall 242. The third sloped surface 232 slopes upward from the bottom of the third vertical wall 242 toward the top of the fourth vertical wall 243. The fourth sloped surface 233 slopes upward from the bottom of the fourth vertical wall 233 toward the top of the first vertical wall 230. The side wall A protrudes from the third sloped surface 232.

The housing 10 further includes a movable member 14 and at least one resilient member 15. The movable member 14 includes a first end 141 and a second end 142 arranged away from each other. The movable member 14 is arranged under the spring tab 136. The first end 141 is rotatably retained within the center hole 135 and the second end 142 passes through the slot 137 and engages one of the sloped surfaces 23 when the battery 20 is retained within the battery cavity 131. Because the spring tab 136 applies a spring force against the movable member 14, the movable member 14 can always stay in contact with the sloped surface 23 during the insertion of the battery 20 into the housing 10. The slot 137 restricts the second end 142 into the first sloped surface 230 when the battery 20 is pushed into the battery cavity 131.

The resilient member 15 is secured to one side wall 132 of the battery retainer 13 and is used to engage the battery 20 to apply a spring force to eject the battery 20. In the exemplary embodiment, the resilient member 15 is a coil spring and the number of the springs 15 is two.

Figure 5:
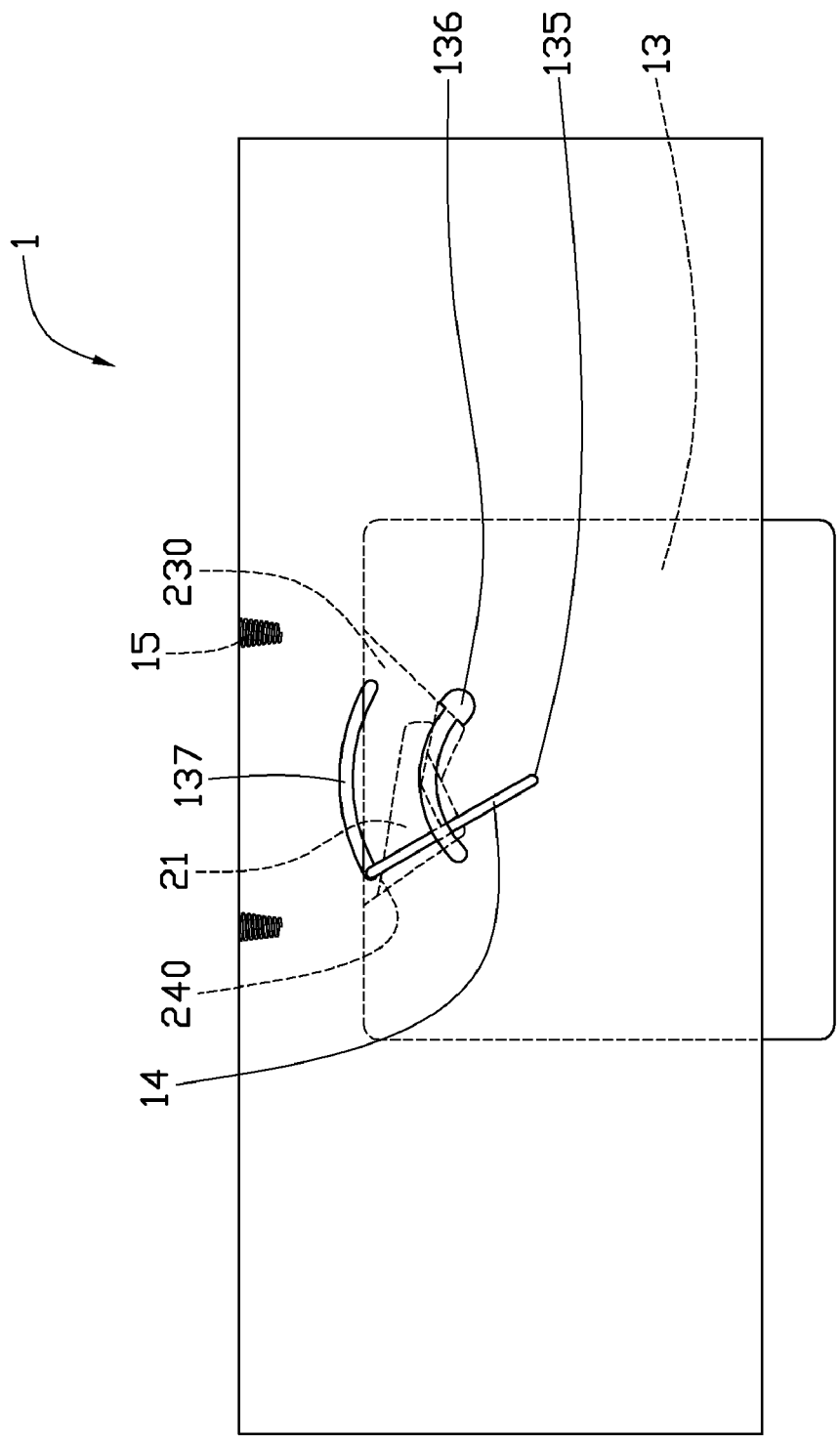
FIG. 5 is a first schematic view of the electronic device of FIG. 1, which shows a movable member engaging a first sloped surface.
Figure 6:
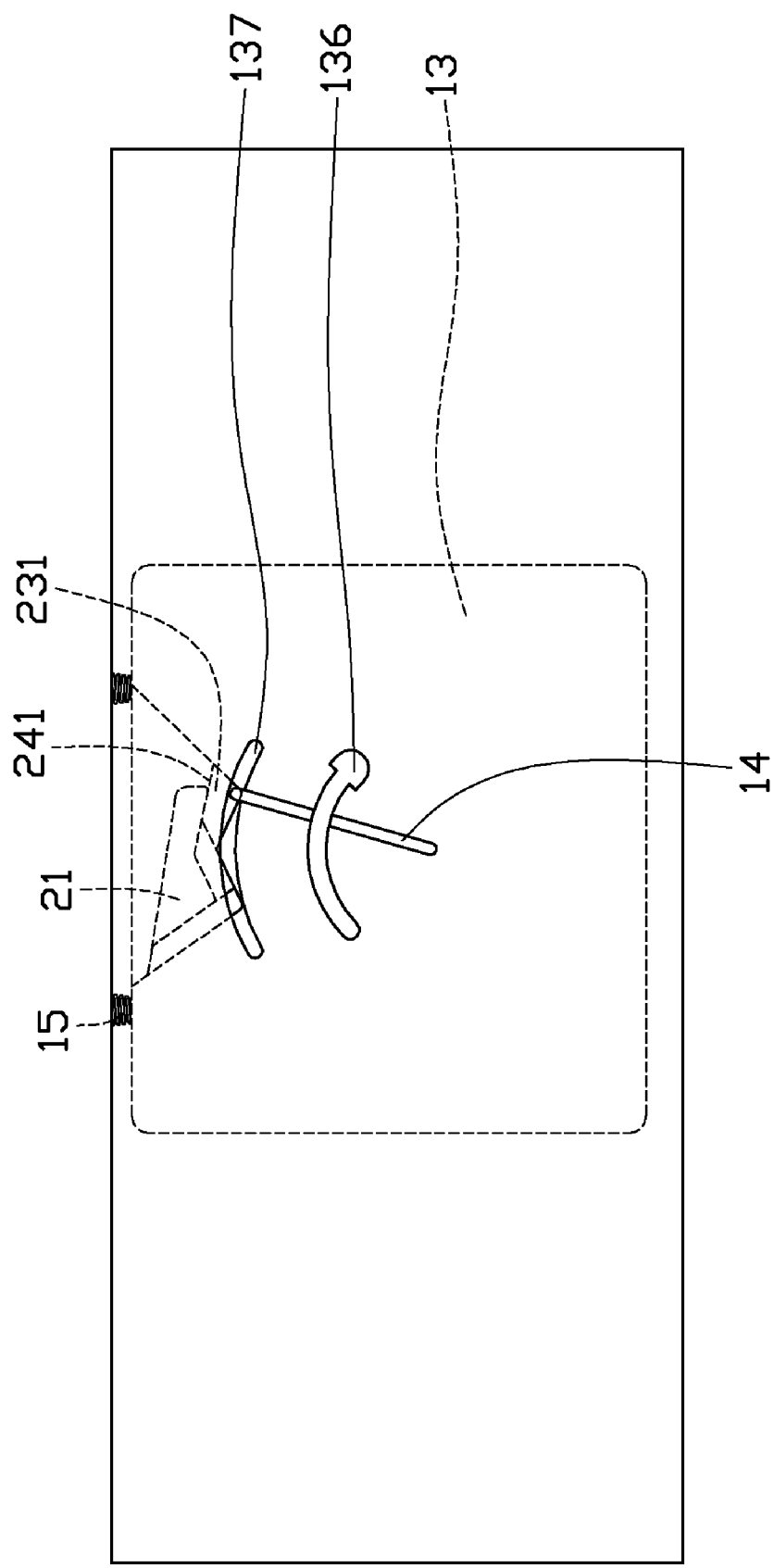
FIG. 6 is a second schematic view of the electronic device of FIG. 1, which shows a movable member engaging a second sloped surface.

Referring to FIGS. 5 and 6, when the battery 20 is pushed into the battery cavity 13, the first sloped surface 230 and the first side wall 211 engage the second end 142. The protrusion 21 drives the second end 142 sliding along the slot 137 till crossing the second vertical wall 241, and the second sloped surface 231 and the second side wall 212 engage the second end 142.

Figure 7:
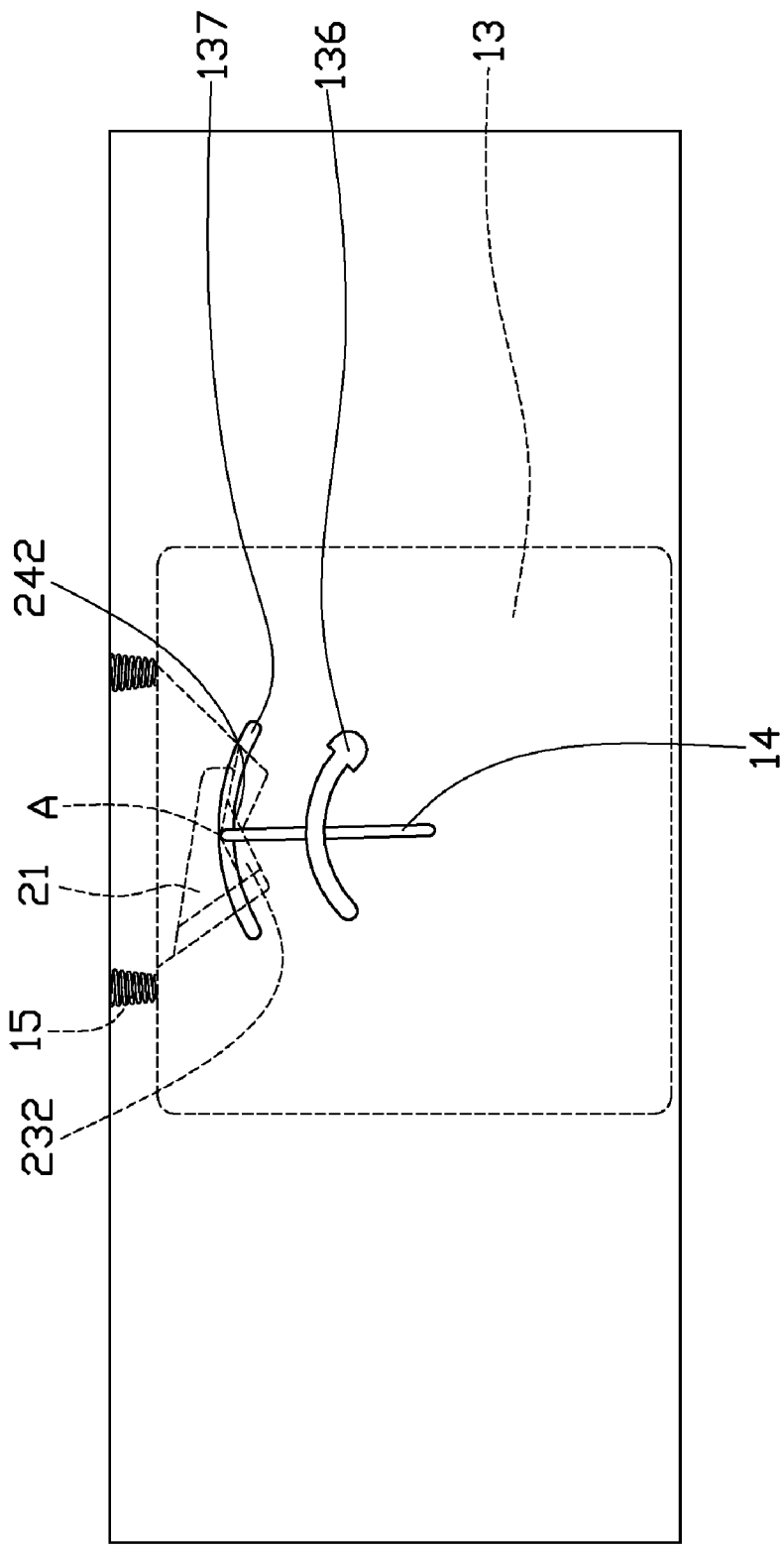
FIG. 7 is a third schematic view of the electronic device of FIG. 1, which shows a movable member engaging in a third sloped surface.

Referring to FIGS. 6 and 7, after the external push has ceased, the spring 15 being compressed applies a spring force to the battery 20. The second vertical wall 240 prevents the second end 142 from being engaged by the first sloped surface 230 and the first side wall 211 again. The second sloped surface 231 drives the second end 142 to slide along the slot 137 till crossing the second vertical wall 242, and the third sloped surface 232 and the third side wall 211 engage the second end 142. The second end 142 resists the side wall A, which retains the battery 20 within the battery cavity 131.

Figure 8:
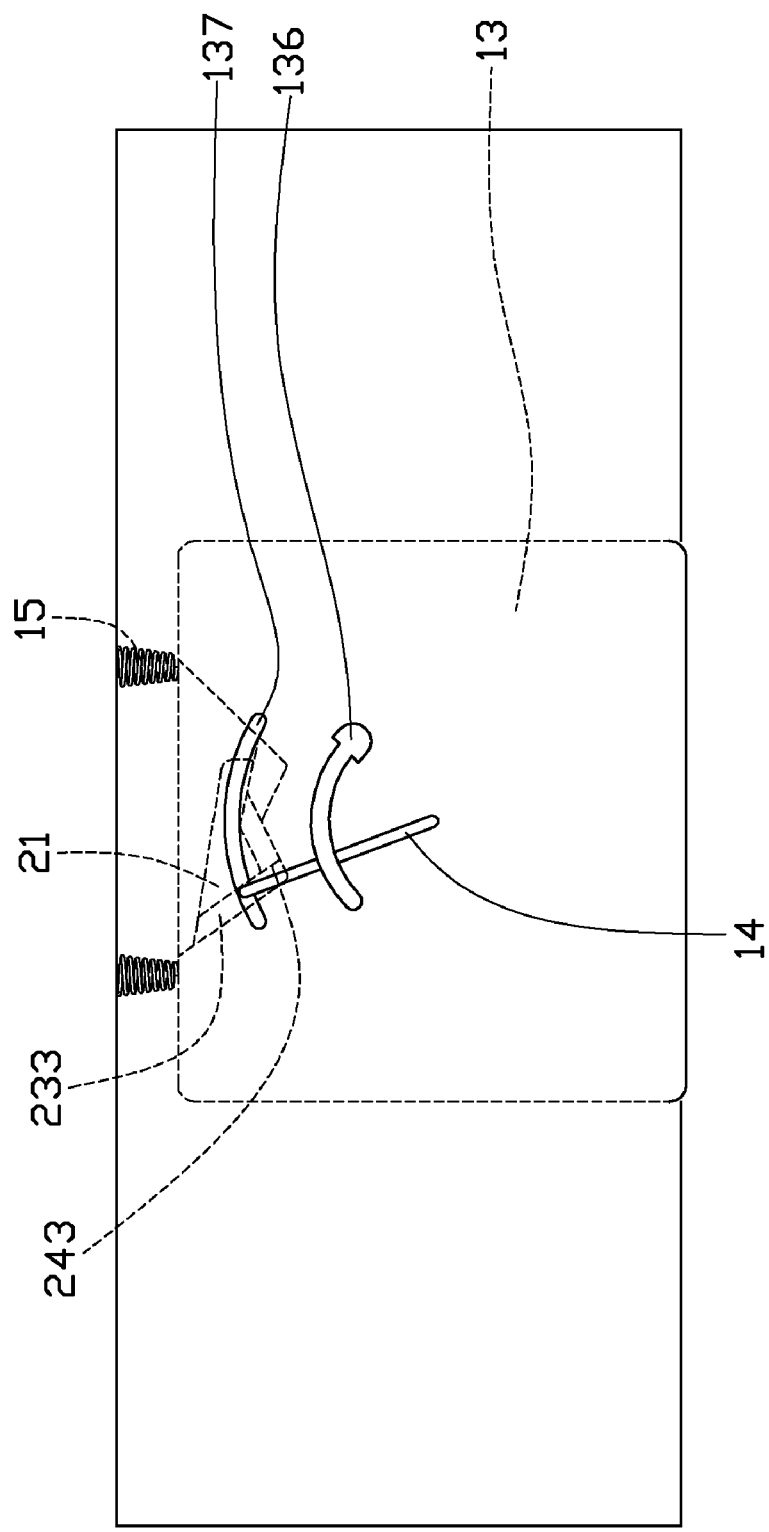
FIG. 8 is a fourth schematic view of the electronic device of FIG. 1, which shows a movable member engaging in a fourth sloped surface.

Referring to FIGS. 7 and 8, to eject the battery 20, the battery 20 is pushed inward. The third vertical surface 242 restricts the second end 142 to be engaged by the second sloped surface 231 again. The third sloped surface 232 drives the second end 142 sliding along the slot 137 till crossing the fourth vertical 243 wall and the fourth sloped surface 233 and the fourth side wall 214 engage the second end 142. After the external push has ceased, the spring 15 being compressed ejects the battery 20.

Although the present disclosure has been specifically described on the basis of the embodiments thereof, the disclosure is not to be construed as being limited thereto. Various changes or modifications may be made to the embodiments without departing from the scope and spirit of the disclosure.

What is claimed is:

1. An electronic device comprising:
a housing;
a battery retainer arranged within the housing, the battery retainer defining a battery cavity and comprising a spring tab comprising a fixing end fixed to the battery retainer and a free end, which constitutes a cantilevered structure;
a battery received in the battery cavity and defining a recessed portion and a protrusion protruding from a bottom of the recessed portion, wherein the recessed portion includes a plurality of sloped surfaces and vertical walls surrounding the protrusion, the plurality of sloped surfaces comprises a first sloped surface, a second sloped surface, a third sloped surface and a fourth sloped surface, the plurality of vertical walls comprise a first vertical wall, a second vertical wall, a third vertical wall and a fourth vertical wall, the first sloped surface slopes upward from a bottom of the first vertical wall toward a top of the second vertical wall, the second sloped surface slopes upward from a bottom of the second vertical wall toward a top of the third vertical wall, the third sloped surface slopes upward from a bottom of the third vertical wall toward a top of the fourth vertical wall and the fourth sloped surface slopes upward from a bottom of the fourth vertical wall toward a top of the first vertical wall, and the protrusion comprises a side wall A protruding from the third sloped surface;
a movable member comprising a first end and a second end, wherein the movable member is pressed by the spring tab, the first end is rotatably connected to battery retainer and the second end engages one of the plurality of sloped surfaces when the battery is retained within the battery cavity, the second end also engages the side wall A to retain the battery within the battery cavity; and
at least one resilient member secured to the battery retainer to apply a force to eject the battery;
wherein, to remove the battery from the electronic device, the battery is further pushed into the battery cavity, one of the plurality of sloped surfaces engages the second end of the movable member to move the second end until the second end disengages from the side wall of the protrusion, which allows the battery to be ejected by the at least one resilient member.

2. The electronic device as described in claim 1, wherein the battery retainer defines a center hole, the first end of the movable member is rotatably retained in the center hole.

3. The electronic device as described in claim 2, wherein the battery retainer further defines a slot, the second end passes through the slot to engage with the plurality of sloped surfaces.

4. The electronic device as described in claim 3, wherein the slot is arc shaped.

5. An electronic device comprising:
a housing;
a battery retainer arranged within the housing, the battery retainer defining a battery cavity, a center hole, and an arc-shaped slot, and comprising a spring tab comprising a fixing end fixed to the battery retainer and a free end, which constitutes a cantilevered structure;
a battery received in the battery cavity and defining a recessed portion and a center hole, and comprising a protrusion protruding from a bottom of the recessed portion, wherein the recessed portion comprises a plurality of sloped surfaces and vertical walls surrounding the protrusion, the plurality of sloped surfaces comprises a first sloped surface, a second sloped surface, a third sloped surface and a fourth sloped surface, the protrusion comprises a side wall A protruding from the third sloped surface, the plurality of vertical walls comprise a first vertical wall, a second vertical wall, a third vertical wall and a fourth vertical wall, the first sloped surface slopes upward from the bottom of the first vertical wall toward the top of the second vertical wall, the second sloped surface slopes upward from the bottom of the second vertical wall toward the top of the third vertical wall, the third sloped surface slopes upward from the bottom of the third vertical wall toward the top of the fourth vertical wall and the fourth sloped surface slopes upward from the bottom of the fourth vertical wall toward the top of the first vertical wall;
a movable member comprising a first end rotatably retained in the center hole of the battery retainer and a second end passing through the arc-shaped slot, wherein the movable member is pressed by the spring tab, the first end is rotatably connected to battery retainer and the second end engages one of the plurality of sloped surfaces when the battery is retained within the battery cavity, the second end also engages the side wall A to retain the battery within the battery cavity; and
at least one resilient member secured to the battery retainer to apply a force to eject the battery;
wherein, to remove the battery from the electronic device, the battery is further pushed into the battery cavity, one of the plurality of sloped surfaces engages the second end of the movable member to move the second end until the second end disengages from the side wall A of the protrusion, which allows the battery to be ejected by the at least one resilient member.

6. The electronic device as described in claim 1, wherein the at least one resilient member is a coil spring.

7. The electronic device as described in claim 1, wherein the number of the at least one resilient member is two.

8. An electronic device comprising:
a housing;
a battery retainer arranged within the housing and defining a battery cavity;
a battery slidably received in the battery cavity and comprising a protrusion comprising a plurality of side walls oriented obliquely to a sliding direction of the battery, wherein the plurality of side walls comprise a first side wall, a second side wall connected the first side wall, a third side wall connected the second side wall, and a fourth side wall connected to the third side wall and the first side wall, and the second side wall and the third side wall cooperatively define a side wall A therebetween;

a movable member comprising a first end rotatably connected to the battery retainer and a second end engaging with the first side wall, the second side wall, the side wall A, the third side wall, or the fourth side wall; and at least one resilient member secured to the battery retainer to apply a force to eject the battery;

wherein when driven by the insertion of the battery, the second end of the movable member keeps engaging along the first side wall till the second side wall or the third side wall, and when no external push force is applied to the battery, the at least one resilient member drives the second end to keep engaging along the second side wall or the third side wall till the second end abuts against the side wall A, thereby preventing the battery from sliding out of the battery cavity, and when driven by further inward insertion of the battery, the second end keeps engaging along the third side wall till the fourth side wall, and when no external push force is applied to the battery, the at least one resilient member drives the second end to keep engaging along the fourth side wall till the first side wall, thus allowing the at least one resilient member to eject the battery out of the battery cavity.

\* \* \* \* \*